Sept. 24, 1940. F. M. HUTCHINSON Re. 21,580
MATTRESS Orig. 2,207,095
Original Filed Sept. 26, 1939
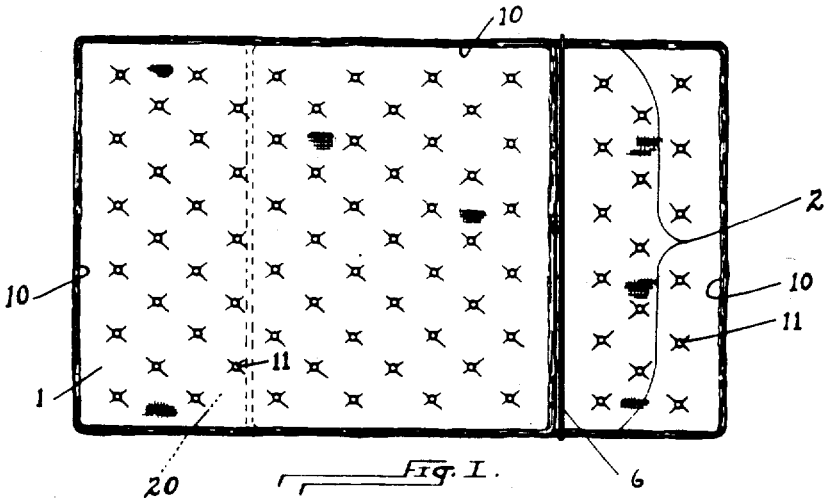
Fig. I.
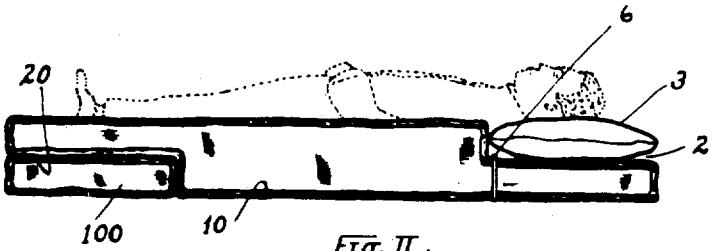
Fig. II.
Fig. III.
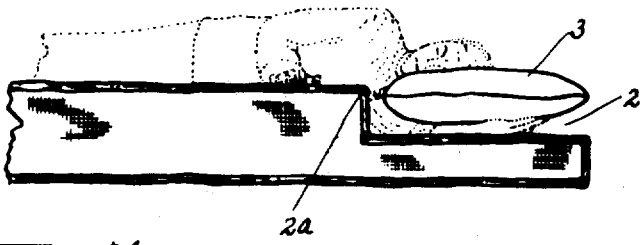
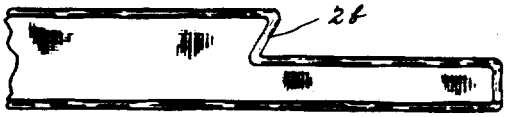
Fig. IV.
INVENTOR
Francis M. Hutchinson
by Christy and Wharton
his attorneys

UNITED STATES PATENT OFFICE 21,580

MATTRESS

Francis M. Hutchinson, Mariemont, Ohio

Original No. 2,207,095, dated July 9, 1940, Serial No. 296,590, September 26, 1939. Application for reissue July 30, 1940, Serial No. 348,534

4 Claims. (Cl. 5—345)

My invention relates to mattresses for beds, and consists in particular refinements in mattress construction, by virtue of which a sleeper may rest his head upon a pillow and yet lie on a substantially level surface, his head not raised by the pillow above the general level of the mattress.

Essentially the mattress of the invention is stepped at its head end, providing a reentrant recess that affords accommodation for a pillow, with the effect that a sleeper may lie prone, with his neck freely extended in natural alignment with his spine, and with his head resting upon the pillow in the recess.

A mattress embodying the invention is illustrated in the accompanying drawing, in which Fig. I is a view of the mattress in plan from above. Fig. II is a view of the mattress in side elevation, with a pillow in position in the reentrant recess provided in the head end of the mattress; a sleeper is shown in dotted lines, lying outstretched upon the flat of his back. Fig. III is a fragmentary view of the mattress and pillow in side elevation, illustrating the sleeper lying upon his side. Fig. IV is a fragmentary view of the mattress in side elevation, illustrating a modification in detail.

Referring to the drawing, the mattress 1 may in all respects other than those presently to be described be of known construction, consisting in a thick bed of hair, cotton, or other material of which the bodies of mattresses are usually formed, enclosed within a rectangular cloth casing. In usual way the edges and corners of the mattress may be strengthened, by means of a sewn piping or beading 10, and the body of the mattress may be reinforced, at spaced-apart points in its expanse, by means of the usual internal ties (not shown) that are anchored to buttons or tabs 11. And, if desired, the mattress may be provided with inner springs, and with air vents, and with such other structural refinements as are already known to the art.

In accordance with the invention, I form in the rectangular body of the mattress a reentrant recess 2. Such recess extends along the edge of the mattress at its head end, and is continued throughout the breadth of mattress from side to side. The recess is adapted to afford accommodation for a pillow 3, the body portion of the mattress immediately beneath the recess providing a pillow-supporting shelf, so to speak, whose upper surface extends in the horizontal mid-plane of the mattress body. It will be perceived that the pillow 3 is positioned with its upper surface in substantially common plane with the upper surface of the mattress, and, as so positioned, the pillow is adapted to support the head of a sleeping person at substantially the same level that the main body of the mattress supports his torso. As shown in dotted lines in Fig. II, the sleeper may lie prone on his back, with his head resting upon the pillow, and his neck extending freely in natural alignment with his spine. Reclining in this natural position, the sleeper is more comfortably and completely rested.

The mattress of the invention also is more comfortable and restful to a sleeper who lies on his side. It will be understood that a person lying on his side on the usual flat mattress, has one of his shoulders (the shoulder on the side on which he is lying) pressed beneath him, in such manner that his chest is cramped, and normal respiration is hindered. In the use of my mattress this objection is obviated. As shown in Fig. III, the shoulders of the sleeper extend beyond, or outward from, the corner 2a formed in the mattress at the inner edge of the reentrant recess 2, and the shoulder on the underside of the sleeper, extending downward into the recess, is supported by the body portion of the mattress that forms the floor of such recess. The arm and hand on the underside of the sleeper lie in the recess, and may be comfortably positioned beneath the pillow, as shown. It will be understood that in this position the sleeper rests comfortably, with his head and neck extending in alignment with his spine. In refinement, the recess 2 may extend into the body of the mattress beneath the corner 2a; that is, the shoulder formed by the recess in the mattress body may be inclined (as shown at 2b in Fig. IV), with the effect that the sleeper's lower arm may be more comfortably positioned.

In still further refinement, the body of the mattress is provided with a second reentrant recess, 20, extending along the lower edge of the mattress, diagonally opposite to the edge on which recess 2 extends. The advantage of such elaboration is that in service the mattress may from time to time be inverted and reversed in position, in such manner that the foot end of the mattress becomes the head end, and the lower recess 20 becomes the upper pillow-receiving recess 2. Such occasional turning of the mattress prevents the mattress body from sagging in the regions where the weight of the sleeper is most concentrated.

My doubly recessed mattress is provided with a filler member 100 that in size and shape corresponds to the recesses 2 and 20. The filler member may be, though it need not be, constructed of the same materials as the body of the mattress itself. The mattress is, indeed, a two-piece mattress. In service the recess in the nether face of the member 1 receives the member 100, and the recess in upper face of the member 1 receives the pillow 3. While the filler member 100 is shown as a unit structure adapted to be supported, within the nether recess of member 1, freely upon the springs or other support of a bed, it is contemplated that within the appended definition of invention such filler member may be embodied in, or may form a part of, the mattress-supporting structure of the bed.

Conveniently, a strap or an elastic tape 6 may be provided on the mattress, as shown in Figs. I and II, to assist in holding a sheet in proper position. When the sheet has been applied, the tape 6, extending across the top of the sheet, serves to hold the sheet snugly to the mattress, particularly in the corner of the recess 2.

I claim as my invention:

1. A mattress, otherwise of simple rectangular form, having a reentrant rectangular recess extending along one edge of the mattress body and from side to side, such recess affording accommodation for a pillow, that a sleeper may lie prone with freely extended neck and with his head resting on a pillow within the recess.

2. A two-piece mattress including a body member, otherwise of simple rectangular form, having equal reentrant rectangular recesses extending along two diagonally opposite edges of the mattress body and from side to side, and a filler member of simple rectangular form and of size and shape corresponding to the said recesses adapted to be applied to and to fill either of the said recesses, whereby the mattress may be laid either side up, on a horizontal support, with the filler member in place in the recess in the nether face and the recess in the upper face ready to receive a pillow.

3. The structure of claim 1, together with a tape extending transversely of the mattress body and adapted to secure a sheet in snug position upon the recessed body of said mattress.

4. A mattress, otherwise of conventional form, having a reentrant recess extending along one edge of the mattress body and from side to side, such recess affording accommodation for a pillow, that a sleeper may lie prone with freely extended neck and with his head resting on a pillow within the recess.

FRANCIS M. HUTCHINSON.